United States Patent
Hampapur et al.

(10) Patent No.: US 9,569,298 B2
(45) Date of Patent: *Feb. 14, 2017

(54) MULTI-STAGE FAILURE ANALYSIS AND PREDICTION

(71) Applicant: International Business Machines Corporation, Armonk, NY (US)

(72) Inventors: Arun Hampapur, Norwalk, CT (US); Hongfei Li, Briarcliff Manor, NY (US); Zhiguo Li, Yorktown Heights, NY (US); Yada Zhu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,532

(22) Filed: Feb. 13, 2016

(65) Prior Publication Data

US 2016/0210183 A1 Jul. 21, 2016

Related U.S. Application Data

(63) Continuation of application No. 13/830,700, filed on Mar. 14, 2013, now Pat. No. 9,262,255.

(51) Int. Cl.
*G06F 11/00* (2006.01)
*G06F 11/07* (2006.01)
(Continued)

(52) U.S. Cl.
CPC ......... *G06F 11/079* (2013.01); *G06F 11/0709* (2013.01); *G06F 11/0751* (2013.01);
(Continued)

(58) Field of Classification Search
CPC . G06F 11/079; G06F 11/2094; G06F 11/3447; G06F 11/3452; G06F 11/3668; G06F 21/577; G06Q 10/04; G06Q 10/20; G06Q 10/0635
(Continued)

(56) References Cited

U.S. PATENT DOCUMENTS 6,353,902 B1 3/2002 Kulatunge et al.
6,493,723 B1 12/2002 Busche
(Continued)

FOREIGN PATENT DOCUMENTS

JP 2004186445 A 7/2004

OTHER PUBLICATIONS

Cheng et al.; Ttl: Multistep-ahead time series prediction; Conf. Ttl: Applications of Evolutionary Computing. Evo Workshops 2006; Apr. 2006; Publisher: Springer-Verlag, Berlin; Country of Publication: Germany; ISBN: 3-540-33237-5; Database: INSPEC, pp. 1-10.

(Continued)

*Primary Examiner* — Elmira Mehrmanesh
(74) *Attorney, Agent, or Firm* — Daniel P. Morris; Otterstedt, Ellenbogen & Kammer, LLP

(57) ABSTRACT

A hierarchical multi-stage model of asset failure risk for complex heterogeneously distributed physical assets is built. The hierarchical multi-stage model considers heterogeneity of failure patterns for the assets. At least one data stream is analyzed to determine whether the hierarchical multi-stage model needs to be updated due to a change in the failure patterns. If the analysis indicates that the hierarchical multi-stage model needs to be updated, the hierarchical multi-stage model is dynamically updated to obtain an updated hierarchical multi-stage model.

17 Claims, 8 Drawing Sheets

(51) Int. Cl.
*G06N 7/00* (2006.01)
*G06N 99/00* (2010.01)

(52) U.S. Cl.
CPC ......... *G06F 11/0787* (2013.01); *G06N 7/005* (2013.01); *G06N 99/005* (2013.01)

(58) Field of Classification Search
USPC .................................... 714/26, 47.2, 47.3
See application file for complete search history.

(56) References Cited

U.S. PATENT DOCUMENTS

| | | |
|---|---|---|
| 6,622,264 B1 | 9/2003 | Bliley et al. |
| 6,625,569 B2 | 9/2003 | James et al. |
| 7,457,763 B1 | 11/2008 | Garrow et al. |
| 7,509,537 B1 | 3/2009 | Jensen et al. |
| 7,730,364 B2 | 6/2010 | Chang et al. |
| 7,750,639 B2 | 7/2010 | Quint et al. |
| 8,306,943 B2 | 11/2012 | Yepremyan et al. |
| 8,392,153 B2 | 3/2013 | Pednault et al. |
| 8,423,397 B2 | 4/2013 | Sitton |
| 8,660,875 B2 | 2/2014 | Yedatore et al. |
| 8,799,042 B2 | 8/2014 | Hampapur et al. |
| 8,819,065 B2 | 8/2014 | Dong et al. |
| 2002/0019870 A1 | 2/2002 | Chirashnya et al. |
| 2004/0162811 A1 | 8/2004 | Wetzer et al. |
| 2004/0193467 A1 | 9/2004 | Williams et al. |
| 2007/0021955 A1 | 1/2007 | Tolone et al. |
| 2008/0312990 A1 | 12/2008 | Byrne |
| 2010/0250497 A1 | 9/2010 | Redlich et al. |
| 2011/0066898 A1 | 3/2011 | Mcrory et al. |
| 2011/0153419 A1 | 6/2011 | Hall, III |
| 2012/0059684 A1 | 3/2012 | Hampapur et al. |
| 2012/0130688 A1 | 5/2012 | Jiang et al. |
| 2012/0130759 A1 | 5/2012 | Davenport et al. |
| 2012/0173300 A1 | 7/2012 | Davenport et al. |
| 2012/0173301 A1 | 7/2012 | Dong et al. |
| 2012/0316906 A1 | 12/2012 | Hampapur et al. |
| 2014/0281713 A1 | 9/2014 | Hampapur et al. |

OTHER PUBLICATIONS

IBM, "Maximo Asset Management", downloaded from http://www-01.ibm.com/software/tivoli/products/maximo-asset-mgmt/ Mar. 3, 2013, p. 1 of 1.

Page, E. S., "Continuous Inspection Schemes," Biometrika, 1954, 41, 100-115.

Page E. S., "On problems in which a change in a parameter occurs at an unknown point," Biometrika 1957; 44:248-252.

Ganti V., Gehrke J., Ramakrishnan R., and Loh W-Y, "A framework for measuring differences in data characteristics". Journal of Computer and System Sciences 2002; 64:542-578.

Li Z., Zhou S., Sievenpiper C., and Choubey S., "Change Detection in the Cox Proportional Hazards Models from Different Reliability Data". Quality and Reliability Engineering International 2010; 26:677-689, 2010.

Li Z., Zhou S., Sievenpiper C., and Choubey S., "Statistical Monitoring of Time-to-Failure Time data Using Rank Tests". Quality and Reliability Engineering International 2012; 28:321-333, 2012.

Anon., "Statistical process control", downloaded from http://en.wikipedia.org/wiki/Statistical_process_control, Mar. 13, 2013, pp. 1-5.

MULTI-STAGE FAILURE ANALYSIS AND PREDICTION

CROSS-REFERENCE TO RELATED APPLICATIONS

This application is a continuation of U.S. patent application Ser. No. 13/830,700 filed Mar. 14, 2013, which issued Feb. 16, 2016 as U.S. Pat. No. 9,262,255, the complete disclosure of which is expressly incorporated herein by reference in its entirety for all purposes.

STATEMENT OF GOVERNMENT RIGHTS

Not Applicable.

FIELD OF THE INVENTION

The present invention relates to the electrical, electronic, information technology, and computer arts, and, more particularly, to analysis and optimization techniques and the like.

BACKGROUND OF THE INVENTION

Asset failure analysis and prediction includes a number of different pieces, such as failure frequency, failure association and failure predication. Assets are distributed over space and asset condition information is collected over time. Asset condition assessment is a process which varies over geographical areas. Current failure analysis and prediction processes are static in nature, and address the different pieces separately.

SUMMARY OF THE INVENTION

Principles of the invention provide techniques for multi-stage failure analysis and prediction. In one aspect, an exemplary method includes the step of building a hierarchical multi-stage model of asset failure risk for complex heterogeneously distributed physical assets. The hierarchical multi-stage model considers heterogeneity of failure patterns for the assets. Further steps include analyzing at least one data stream to determine whether the hierarchical multi-stage model needs to be updated due to a change in the failure patterns; and, if the analysis indicates that the hierarchical multi-stage model needs to be updated, dynamically updating the hierarchical multi-stage model to obtain an updated hierarchical multi-stage model.

In another aspect, an exemplary apparatus includes a memory; at least one processor, coupled to the memory; and a non-transitory tangible, computer-readable, recordable storage medium having embodied thereon instructions. The instructions, when loaded into the memory, configure the at least one processor to implement a hierarchical multi-stage model of asset failure risk for complex heterogeneously distributed physical assets, a change detection component, and a sequential model updating component. The hierarchical multi-stage model considers heterogeneity of failure patterns for the assets, and in turn includes a failure frequency analysis engine; a failure association analysis engine; and a failure prediction analysis engine. The change detection component analyzes at least one data stream to determine whether the hierarchical multi-stage model needs to be updated due to a change in the failure patterns. The sequential model updating component, if the analysis indicates that the hierarchical multi-stage model needs to be updated, dynamically updates the hierarchical multi-stage model to obtain an updated hierarchical multi-stage model.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein; the means exclude transmission media per se and disembodied signals per se.

Techniques of the present invention can provide substantial beneficial technical effects. For example, one or more embodiments may provide one or more of the following advantages:

- By making full use of complex and multivariate connected data types, techniques of one or more embodiments of the invention are able to significantly enhance failure prediction accuracy;
- Model change detection is integrated in the techniques to keep the failure prediction models up to date, and the models can be updated automatically once a change is detected;
- The techniques leverage both the spatial and temporal environmental conditions to handle heterogeneously distributed assets.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

As noted, assets are distributed over space and asset condition information is collected over time. Asset condition assessment is a process which varies over geographical areas and needs to be updated dynamically. Current failure analysis and prediction techniques are static. Advantageously, one or more embodiments, unlike current techniques, can handle process updates sequentially; can handle heterogeneously distributed assets and/or can handle complex, multi-dimensional, connected asset bases. One or more embodiments provide a hierarchical and dynamic approach for asset failure risk assessment.

Indeed, one or more embodiments provide a method of multi-stage failure analysis and prediction for dynamic asset management. Multi-stage modeling is advantageous in the asset management process from at least two perspectives. First, due to asset management operations and asset conditions changing over time, the failure prediction model should be updated to accommodate the new data stream. Second, due to heterogeneous distribution of asset failure risk for complex connected assets, one model constant over segments is not appropriate. Consider, for example, heterogeneity due to geospatial areas, seasons, the manufacturer and/or installer of assets, demographic segments, and the like.

Figure 1:
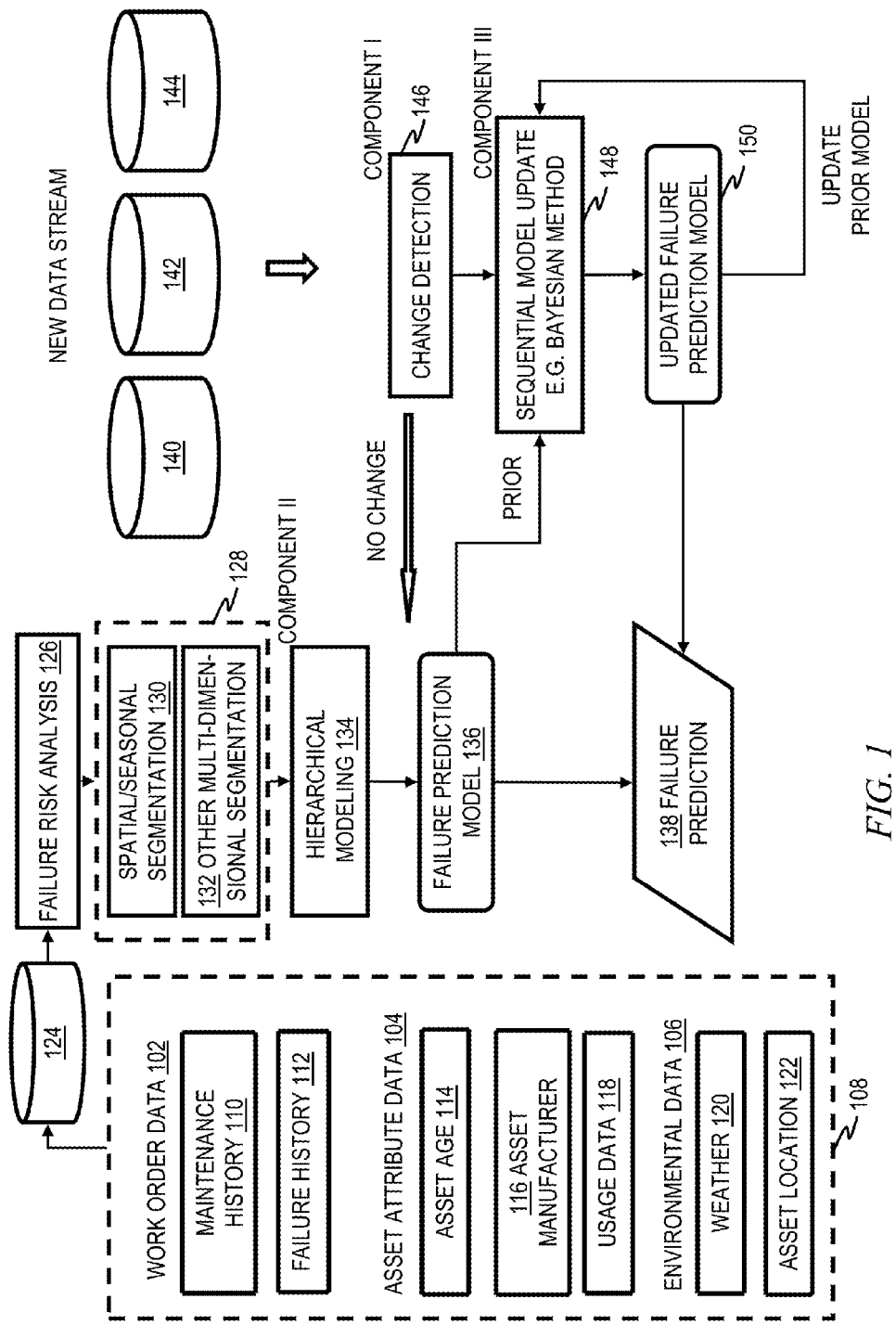
FIG. 1 shows an exemplary flow chart for multi-stage failure analysis and prediction, in accordance with an aspect of the invention.

FIG. 1 shows an exemplary flow chart and block diagram 100 for multi-stage failure analysis and prediction, in accordance with an aspect of the invention. Database 124 includes input data 108. Such data broadly includes work order data 102, asset attribute data 104, and environmental data 106. Work order data 102 includes maintenance history 110 and failure history 112. Asset attribute data 104 includes asset age 114, asset manufacturer 116, and usage data 118. Environmental data 106 includes weather 120 and asset location 122. In at least some cases, failure risk analysis component 126 pre-processes the data 108 from database 124, by segmenting same in accordance with spatial and/or seasonal segmentation 130 and/or other multi-dimensional segmentation 132, to obtain segmented data 128.

In one or more embodiments, a model detection algorithm implemented by first component 146 is applied when one or more new data streams 140, 142, 144 come in, so as to detect new asset management operations and/or updated asset condition(s) which suggest that a change should be made in the original failure prediction model 136. In at least some cases, a hierarchical modeling approach implemented by a second component 134 is applied to integrate heterogeneous clusters of asset failure risks (e.g., from segmented data 128). In at least some instances, when model changing is confirmed, sequential model updating is performed using Bayesian methodology with third component 148 and the original failure prediction model 136 is the input as prior information. This results in an updated failure prediction model 150 which can be used to generate failure prediction 138. If no change is detected by component 146, the previous model 136 continues to be used.

Figure 2:
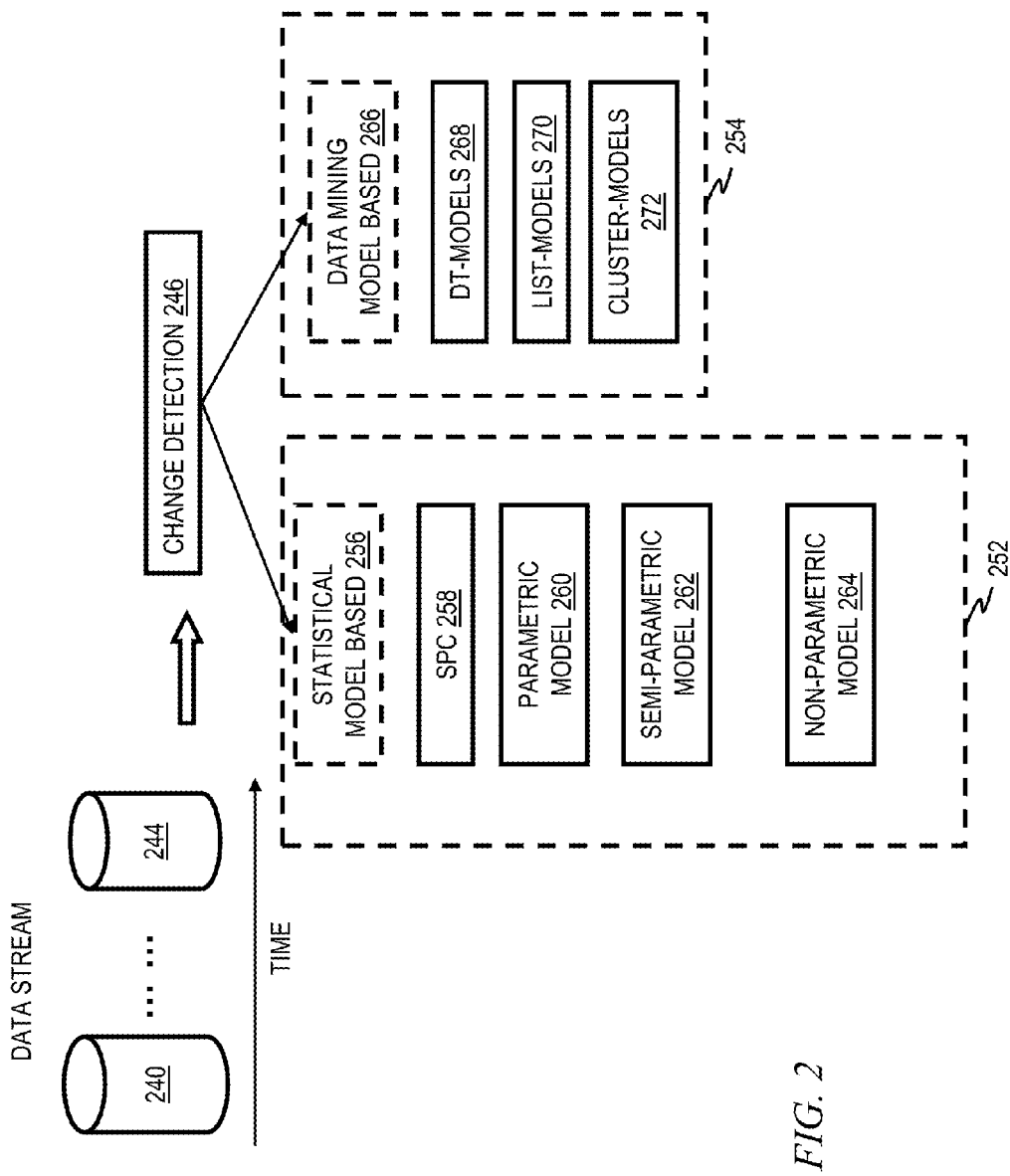
FIG. 2 shows an exemplary model change detection component, in accordance with an aspect of the invention.

FIG. 2 shows an exemplary model change detection component, in accordance with an aspect of the invention. Elements analogous to those in FIG. 1 have received the same reference character, incremented by one hundred. Change detection component 246 operates on one or more new data streams 240 . . . 244. These streams represent changes that occur over time. Change detection model 246 may use one or more of a variety of techniques; for example, statistical model-based techniques 256, examples of which are shown at 252; and/or data mining model-based techniques 266, examples of which are shown at 254. In particular, statistical model-based techniques include statistical process control (SPC) 258; parametric modeling 260; semi-parametric modeling 262; and non-parametric modeling 264. Data mining model-based techniques 266 include Decision Tree models (dt-models) 268; list-models 270; and cluster-models 272.

With regard to statistical process control (SPC) 258, the skilled artisan will be familiar with SPC per se and, given the teachings herein, will be able to utilize same in one or more embodiments of the invention. Nevertheless, reference is made to Montgomery, DC, Introduction to Statistical Quality Control (5th ed.), John Wiley & Sons: New York, 2005, expressly incorporated herein by reference in its entirety for all purposes. This book provides a comprehensive treatment of the major aspects of using statistical methodology for quality control and improvement. Both traditional and modern methods are presented, including state-of-the-art techniques for statistical process monitoring and control and statistically designed experiments for process characterization, optimization, and process robustness studies.

With regard to parametric modeling 260, the skilled artisan will be familiar with parametric modeling per se and, given the teachings herein, will be able to utilize same in one or more embodiments of the invention. Nevertheless, reference is made to Page, E. S., "Continuous Inspection Schemes," Biometrika, 1954, 41, 100-115 and Page E. S., "On problems in which a change in a parameter occurs at an unknown point," Biometrika 1957; 44:248-252, both expressly incorporated herein by reference in their entireties for all purposes. These two papers proposed the CUSUM algorithm to detect a process mean change, and in this study, it is utilized to handle the outlier patterns which may not be detected by the information theoretic method. The CUSUM method is among the best methods for detecting small process mean shifts which occur instantaneously and handling individual measurements.

With regard to semi-parametric modeling 262, the skilled artisan will be familiar with semi-parametric modeling per se and, given the teachings herein, will be able to utilize same in one or more embodiments of the invention. Nevertheless, reference is made to Li Z., Zhou S., Sievenpiper C., and Choubey S., Change Detection in the Cox Proportional Hazards Models from Different Reliability Data, Quality and Reliability Engineering International 2010; 26:677-689, 2010, expressly incorporated herein by reference in its entirety for all purposes. This paper develops the methods for change detection in the Cox PH models, also known as Semiparametric PH model, for reliability prediction and/or assessment of the time-to-failure data collected from different subjects. The developed technique possesses wide applicability to the systems and processes where the Cox PH model fits the reliability data well.

With regard to non-parametric modeling 264, the skilled artisan will be familiar with non-parametric modeling per se and, given the teachings herein, will be able to utilize same in one or more embodiments of the invention. Nevertheless, reference is made to Li Z., Zhou S., Sievenpiper C., and Choubey S., Statistical Monitoring of Time-to-Failure Time data Using Rank Tests, Quality and Reliability Engineering International 2012; 28:321-333, 2012, expressly incorporated herein by reference in its entirety for all purposes. A common type of reliability data is the right censored time-to-failure data. This paper developed a control chart to monitor the time-to-failure data in the presence of right censoring using nonparametric weighted rank tests.

With regard to dt-models 268, list-models 270, and cluster-models 272, the skilled artisan will be familiar with dt-models, list-models, and cluster-models per se and, given the teachings herein, will be able to utilize same in one or more embodiments of the invention. Nevertheless, reference is made to Ganti V., Gehrke J., Ramakrishnan R., and Loh W-Y, A framework for measuring differences in data characteristics, Journal of Computer and System Sciences 2002; 64:542-578, expressly incorporated herein by reference in its entirety for all purposes. A data mining algorithm builds a model that captures interesting aspects of the underlying data. A framework is developed for quantifying the difference, called the deviation, between two datasets in terms of the models they induce. The framework covers a wide variety of models including frequent itemsets, decision tree classifiers, and clusters, and captures standard measures of deviation such as the misclassification rate and the chi-squared metric as special cases.

Figure 3:
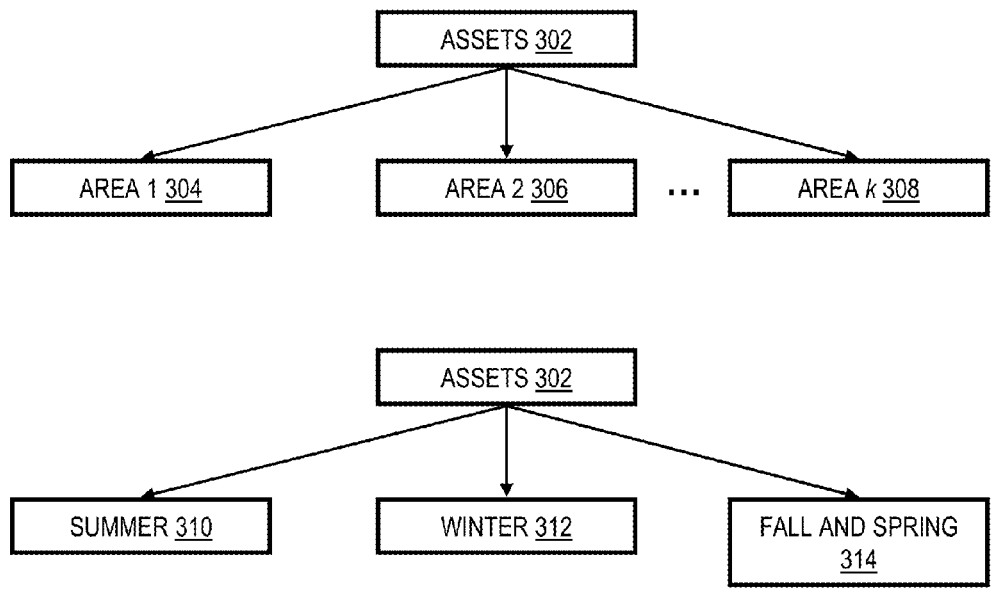
FIG. 3 shows an exemplary hierarchical modeling of failure prediction component, in accordance with an aspect of the invention.

FIG. 3 shows operation of an exemplary component 134 for hierarchical modeling of failure prediction, in accordance with an aspect of the invention. As indicated, assets 302 may be categorized based on their different areas of deployment, e.g., first area 304, second area 306, . . . $k^{th}$ area 308. See also discussion of FIG. 5 below. Furthermore, assets 302 may also be categorized based on their behavior during different seasons, such as summer 310, winter 312, and fall and spring 314. See also discussion of FIG. 5 below.

Figure 4:
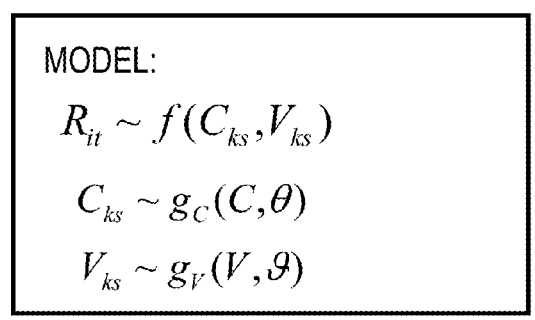
FIG. 4 shows aspects of the model for the component of FIG. 3, in accordance with an aspect of the invention.

FIG. 4 shows aspects of the model for the hierarchical modeling component 134 of FIGS. 1 and 3, in accordance with an aspect of the invention. As indicated at 402 therein, in a first level of modeling, failure risk $R_{it}$ of asset i at future time t depends on two parameters $C_{ks}$, $V_{ks}$ which vary by area cluster k and seasonal cluster s. Furthermore, as indicated at 404, 406 therein, the model parameters $C_{ks}$, $V_{ks}$ in the first level are assumed to follow distributions of $g_C$ and $g_V$ as indicated.

Furthermore in this regard, $C_{ks}$, $V_{ks}$ are two sets of parameters to model the risk. C_ks is to control the mean process while V_ks is control the variation. Both of them vary over time and space. In the hierarchical model, assume $C_{ks}$, $V_{ks}$ follow g_c and g_v processes, respectively, where g_c has two parameters, C and theta and g_v has two parameters, V and zeta.

Figure 5:
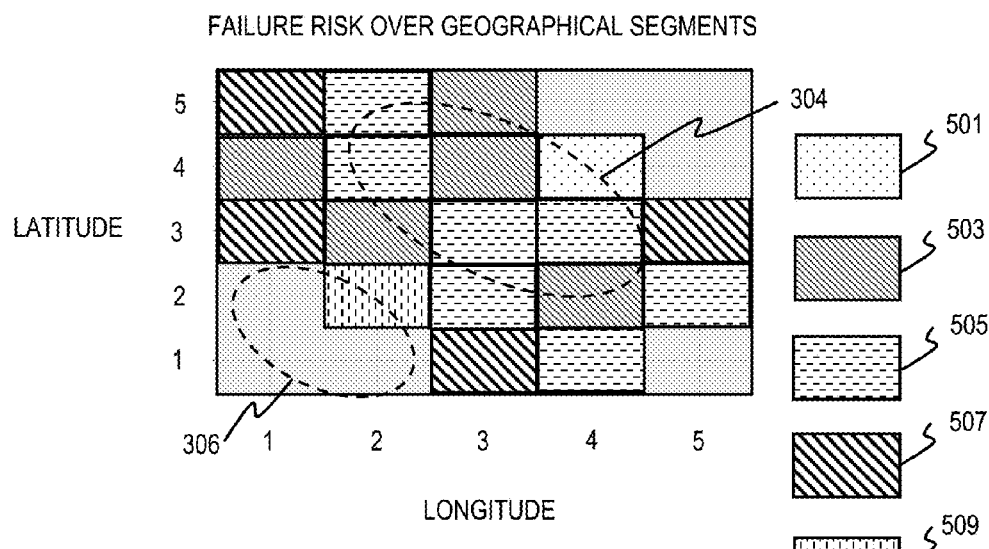
FIG. 5 shows failure risk over geographical segments, in accordance with an aspect of the invention.

FIG. 5 shows failure risk over geographical segments, in accordance with an aspect of the invention. In particular, the horizontal axis shows longitude while the vertical axis shows latitude. The first and second areas mentioned above in connection with respect to FIG. 3 are labeled as such. The confidence level in survival ranges from a high of 75% in the region shaded as at 501, to 70% in the regions shaded as per 503, 65% in the regions shaded as per 505, 60% in the regions shaded as per 507, 55% in the regions shaded as per 509, and down to 50% in the remaining un-shaded regions.

Figure 6:
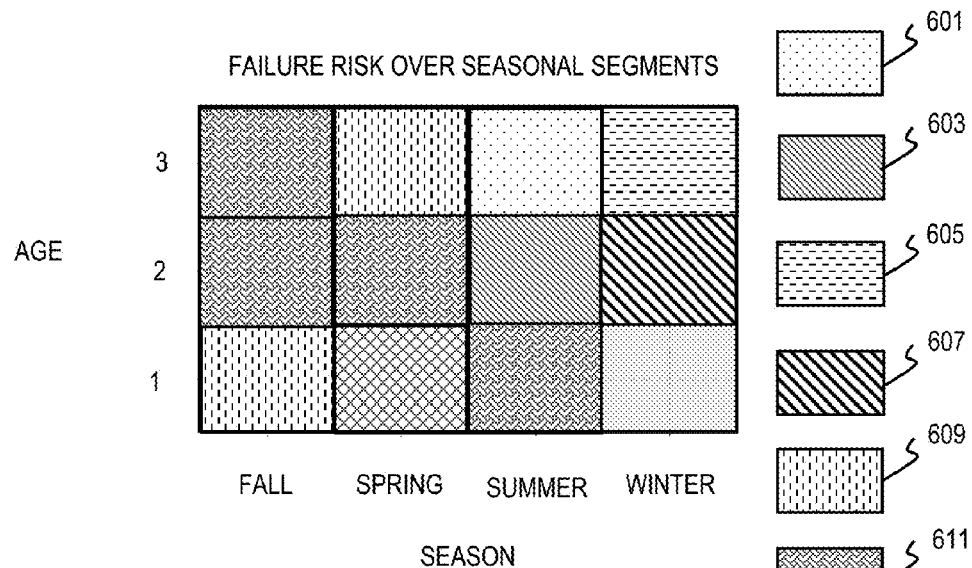
FIG. 6 shows failure risk over seasonal segments, in accordance with an aspect of the invention.

FIG. 6 shows failure risk over seasonal segments, in accordance with an aspect of the invention. In particular, the horizontal axis shows season while the vertical axis shows age. The confidence level in survival ranges from a high of 74% in the region shaded as at 601, to 72% in the regions shaded as per 603, 70% in the regions shaded as per 605, 68% in the regions shaded as per 607, 66% in the regions shaded as per 609, 64% in the regions shaded as per 611, 62% in the regions shaded as per 613, and down to 60% in the remaining un-shaded regions.

Figure 7:
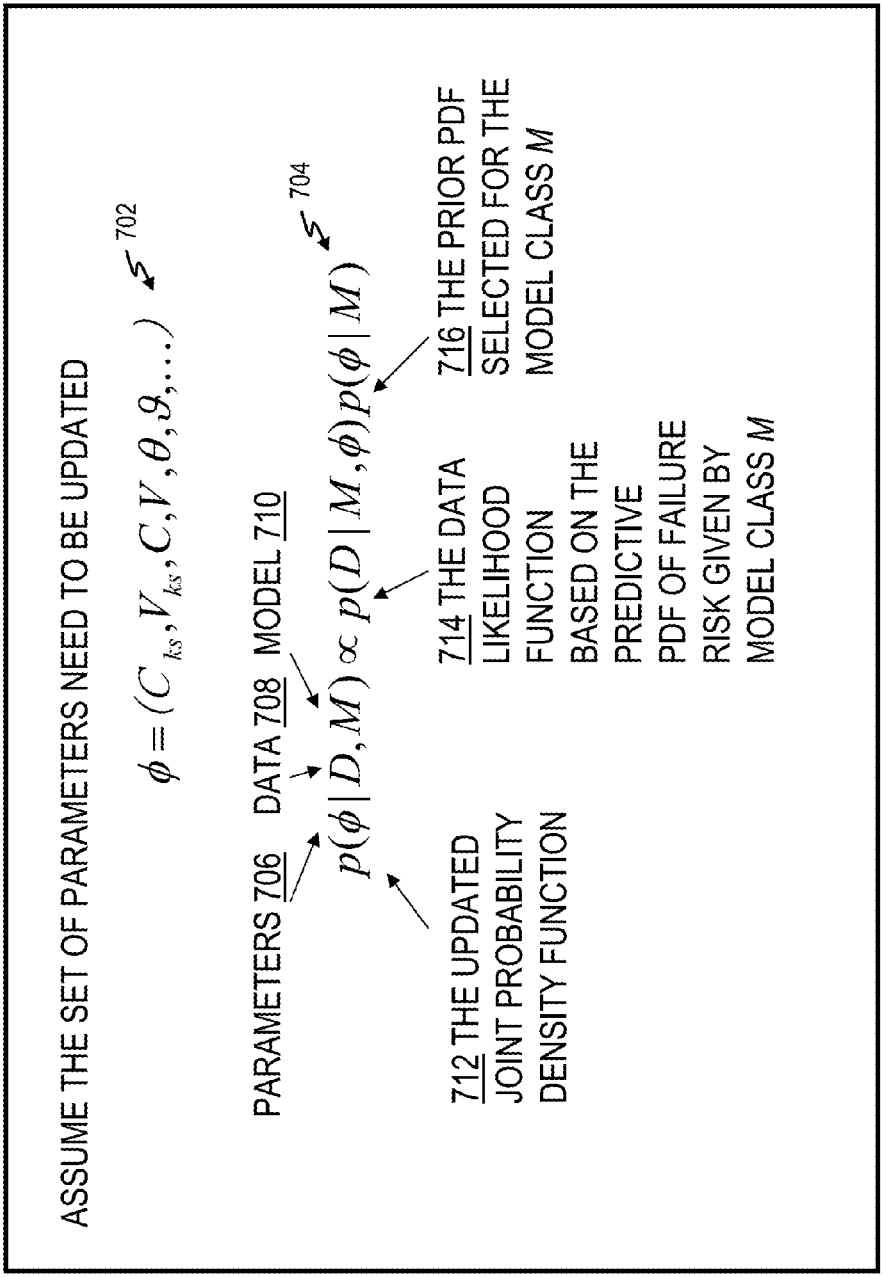
FIG. 7 shows an exemplary Bayesian sequential model updating component, in accordance with an aspect of the invention.

FIG. 7 shows an exemplary Bayesian sequential model updating component, in accordance with an aspect of the invention. The set of parameters, ϕ, which need to be updated are shown at 702. The updated joint probability density function is shown at 712; it shows the conditional probability of the updated parameters 706, given the data 708 and model 710. It is proportional to the product 704 of the data likelihood function 714 based on the predictive probability density function (PDF) of failure risk given by model class M and the prior PDF 716 selected for the model class M.

Thus, one or more embodiments provide a multi-stage method and system for failure analysis of complex heterogeneously distributed physical assets. Asset failure risk is hierarchically modeled, considering cluster variations, such as geographical and environmental impacts. Significant model change(s), given newly available information, is/are dynamically detected. The failure prediction model is sequentially updated.

In some cases, the model change detection uses (but is not necessarily limited to) a statistical model based method and/or a data mining based method.

In some instances, the approach utilizes the hierarchical model to build up the multi-stage process; in some such instances, the hierarchical model is explored and justified by failure association analysis.

In some embodiments, the model updating uses (but is not necessarily limited to) a Bayesian inference method; in some such embodiments, the old model is used as prior information for Bayesian model updating.

As noted, asset failure analysis and prediction includes different pieces, such as failure frequency, failure association and failure predication. Currently, these pieces are separated. Advantageously, one or more embodiments integrate the pieces to provide a hierarchical and complete picture of asset failure risk assessment.

Figure 9:
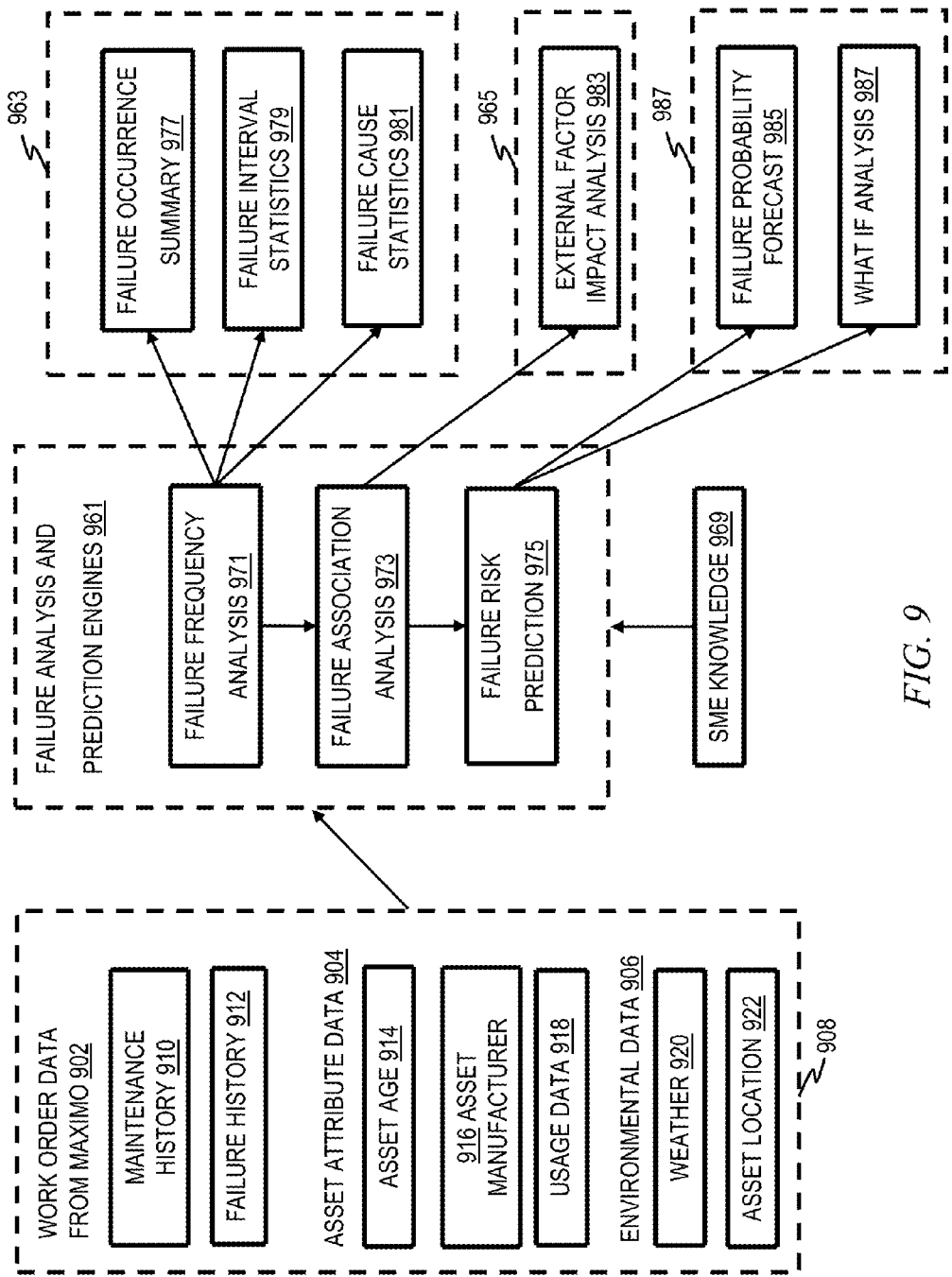
FIG. 9 presents a block diagram, in accordance with an aspect of the invention.

In this regard, the analysis of failure frequency, failure association, and failure prediction serve different purposes and functions for operators in the asset management field, when evaluating the failure risk of assets. Referring to FIG. 9, the combined system incorporates all three types of analysis to implement multi-stage failure analysis and prediction (using failure analysis and prediction engines or components 961). The engines take as input data 908: work order data 902; asset attribute data 904; environmental data 906; and optionally knowledge from a subject mater expert, as seen at 969. In one or more embodiments, the expert(s) will help understand the data, implement variable selection, check mistakes, validate and interpret the model results. The work order data may be obtained, for example, from suitable enterprise asset management software, a non-limiting example of which is Maximo® Asset Management software available from International Business Machines Corporation, Armonk, N.Y., USA.

The work order data 902 can include, for example, maintenance history 910 and failure history 912. The asset attribute data 904 can include, for example, asset age 914, asset manufacturer 916, and usage data 918. The environmental data 906 can include, for example, weather 920 and asset location 922.

Note that inputs 908 have received the same reference character as analogous inputs 108 in FIG. 1, incremented by eight hundred.

The failure frequency analysis system component 971 mainly focuses on the summary of asset failure occurrences 912 by various categories, such as time, locations 922 and/or areas, and manufacturers 916. The failure association analysis component 973 links the failure occurrences with different factors, such as weather 920 or other environmental conditions 906, and asset age 914. The purpose of this analysis is to investigate the causal relationship between external factors and failures, thus guiding operators to manipulate the controllable factors to reduce failure risk. The failure prediction component 975 combines the above information and applies modeling techniques to predict failure risk in the future, which provides a pertinent input to preventive maintenance processes.

Furthermore in this regard, in some embodiments, engine 971 uses maintenance history 910; engine 973 uses maintenance history 910 and usage data 918; and engine 975 uses maintenance history 910 and usage data 918.

All three components of the multi-stage failure analysis and prediction block 961 complement each other to provide a complete picture 963, 965, 967 of failure risk assessment for asset management. In particular, failure frequency analysis engine 971 outputs a failure occurrence summary 963, failure interval statistics 979, and/or failure cause statistics 981. Failure association analysis engine 973 outputs an external factor impact analysis 983. Failure risk prediction engine 975 outputs a failure probability forecast 985 and/or a "what if" analysis 987.

Figure 10:
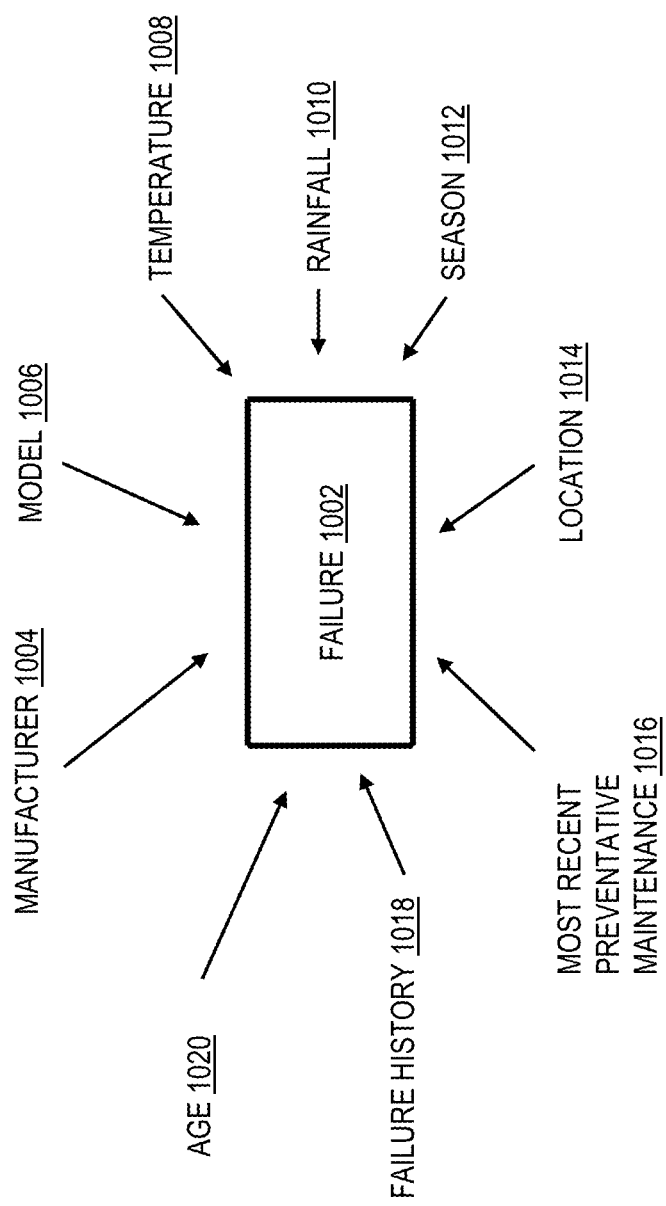
FIG. 10 shows various parameters pertinent to failure analysis, in accordance with an aspect of the invention.

Referring to FIG. 10, the outputs allow for an evaluation of factors influencing failure 1002, including, for example, any one, some, or all of manufacturer 1004, model 1006, temperature 1008, rainfall 1010, season 1012, location 1014, most recent preventative maintenance 1016 (e.g. when performed and/or what was done), failure history 1018, and age 1020.

Thus, in one or more embodiments, the model 136 is dynamically updated when the failure patterns 140, 142, 144 change. Furthermore, one or more embodiments employ a multi-stage model which takes into account heterogeneity of the failure patterns, such as seasonality and geographical distribution.

Furthermore, one or more embodiments generally consider various types of data sources, including equipment failure history, maintenance records, equipment attributes, and sensor data.

Yet further, one or more embodiments integrate failure association analysis and failure model building.

Even further, in one or more embodiments, multi-stage failure analysis and prediction includes failure frequency analysis, failure association analysis, and failure prediction.

Given the discussion thus far, it will be appreciated that, in general terms, an exemplary method, according to an aspect of the invention, includes the step of building a hierarchical multi-stage model 136, 961 of asset failure risk for complex heterogeneously distributed physical assets. This model building step can be carried out, for example, with component 134. The hierarchical multi-stage model considers heterogeneity of failure patterns for the assets. One non-limiting example of considering of the heterogeneity of failure patterns for the assets includes considering seasonality and geographical distribution as explained in FIGS. 3-7 and accompanying text.

The method further includes analyzing at least one data stream 140, 142, 144 to determine whether the hierarchical multi-stage model needs to be updated due to a change in the failure patterns. This step can be carried out, for example, using component 146, 246 as detailed in FIG. 2.

An even further step includes, if the analysis indicates that the hierarchical multi-stage model needs to be updated, dynamically updating the hierarchical multi-stage model to obtain an updated hierarchical multi-stage model 150. This step can be carried out, for example, using model updating component 148 as discussed in FIG. 7 and accompanying text.

As noted, one example of a hierarchical multi-stage model 136 is model 961 of FIG. 9; thus, in some cases, the building step includes building a failure frequency analysis engine 971 of the hierarchical multi-stage model; building a failure association analysis engine 973 of the hierarchical multi-stage model; and building a failure prediction analysis engine 975 of the hierarchical multi-stage model. In one or more embodiments, when a model change is detected in the new data stream, the model will be updated automatically. Given the teachings herein, the skilled artisan will be able to implement such automated updating; for example, by encoding the logic of FIG. 7 into a program for a general purpose computer.

In some cases, the analyzing of the data stream includes analyzing at least one of equipment failure history 112, 912; maintenance records 110, 910; equipment attributes 104, 904; and sensor data. Sensor data is not explicitly shown at 108, 908, but can be present in data streams 140 . . . 144 and 240 . . . 244. System 812 in FIG. 8 could obtain the sensor data via a network interface 814, an analog to digital converter coupled to bus 810, or the like. System 812 is discussed further below.

As depicted in FIG. 2, the analyzing of the data stream can include, for example, carrying out statistical model-based change detection and/or data mining model-based change detection.

As depicted in FIG. 7, the dynamic updating of the hierarchical multi-stage model can include, for example, applying a Bayesian inference technique. In some instances, the previous hierarchical multi-stage model is used as an input to the Bayesian inference technique.

Figure 8:
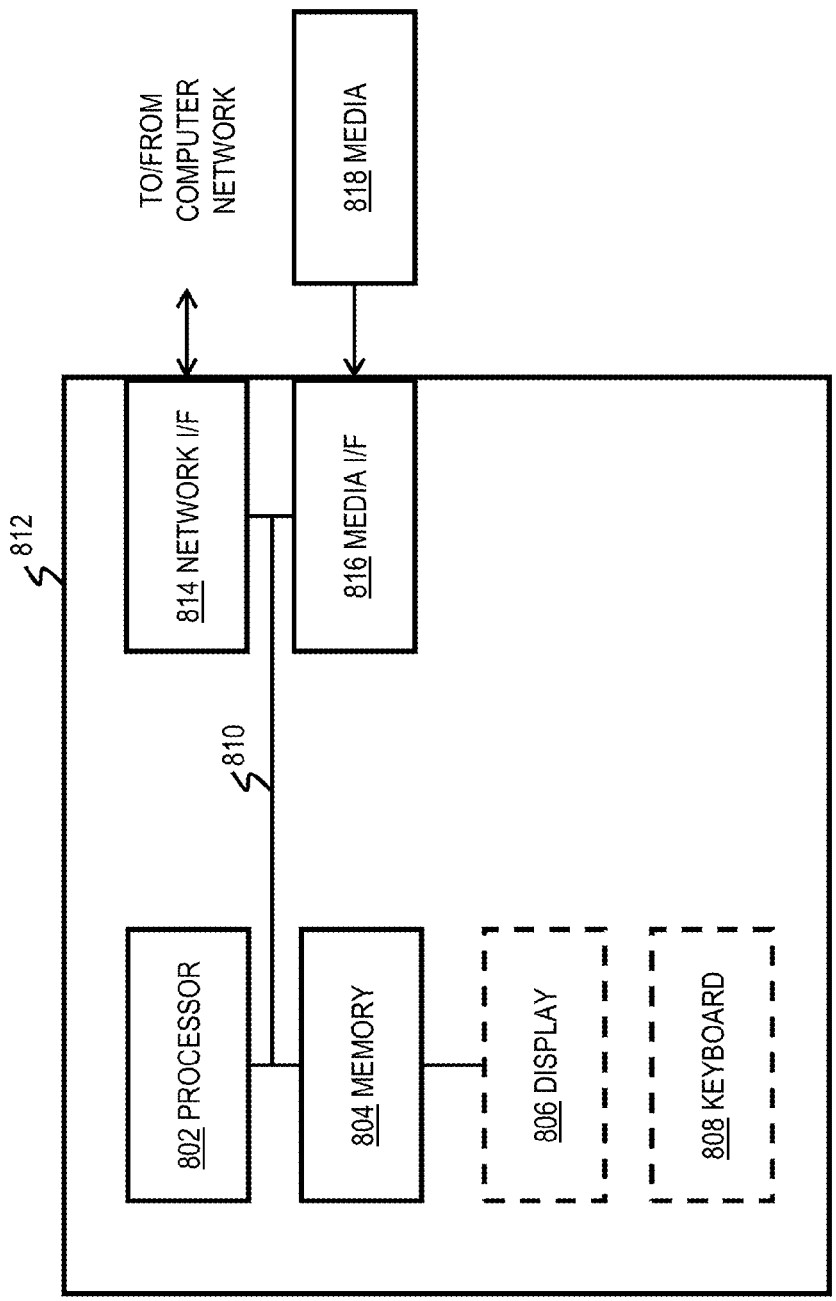
FIG. 8 depicts a computer system that may be useful in implementing one or more aspects and/or elements of the invention.

In another aspect, and referring to FIG. 8 which is discussed in greater detail below, an exemplary apparatus includes a memory 804; at least one processor 802, coupled to the memory, and; a non-transitory tangible, computer-readable, recordable storage medium (e.g., 818 but can also be a fixed disk or the like rather than a removable medium) having embodied thereon instructions which when loaded into the memory configure the at least one processor to implement one or more engines or components shown in the figures. For example, the processor(s) may implement a hierarchical multi-stage model 136 of asset failure risk for complex heterogeneously distributed physical assets. The hierarchical multi-stage model considers heterogeneity of failure patterns for the assets, as discussed above. The hierarchical multi-stage model in turn includes a failure frequency analysis engine 971; a failure association analysis engine 973; and a failure prediction analysis engine 975. The processor(s) further implement a change detection component 146 which analyzes at least one data stream to determine whether the hierarchical multi-stage model needs to be updated due to a change in the failure patterns; and a sequential model updating component 148 which, if the analysis indicates that the hierarchical multi-stage model needs to be updated, dynamically updates the hierarchical multi-stage model to obtain an updated hierarchical multi-stage model.

In some cases, the hierarchical multi-stage model considers the heterogeneity of the failure patterns for the assets by considering seasonality and geographical distribution, as per FIGS. 3-6 and accompanying text.

In some embodiments, the change detection component analyzes the data stream by analyzing at least one of equipment failure history 112, 912; maintenance records 110, 910; equipment attributes 104, 904; and sensor data (discussed above).

In some instances, the change detection component analyzes the data stream by carrying out statistical model-based change detection and/or data mining model-based change detection, as per FIG. 2 and accompanying text.

In one or more embodiments, the sequential model updating component 148 applies a Bayesian inference technique as per FIG. 7 and accompanying text; in some such embodiments, the sequential model updating component uses the hierarchical multi-stage model as an input to the Bayesian inference technique.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a di splay and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a module to implement component I 146, a module to implement component II 134, and a module to implement component III 148. The method steps can then be carried out using the distinct software modules and/or submodules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
building a hierarchical multi-stage model of asset failure risk for complex heterogeneously distributed physical assets, said hierarchical multi-stage model considering heterogeneity of failure patterns for said assets including seasonality and geographical distribution, by:
building a failure frequency analysis engine of said hierarchical multi-stage model;
building a failure association analysis engine of said hierarchical multi-stage model; and
building a failure prediction analysis engine of said hierarchical multi-stage model;
analyzing at least one data stream to determine a change in said failure patterns, including analyzing at least one of equipment failure history, maintenance records, equipment attributes, and sensor data; and
dynamically updating said hierarchical multi-stage model to obtain an updated hierarchical multi-stage model based at least in part on said change in said failure patterns;
wherein said considering heterogeneity of failure patterns for said assets comprises:
performing multi-dimensional segmentation on data comprising failure history for said assets to obtain segmented data; and
implementing hierarchical modeling to integrate heterogeneous clusters of failure risks for said assets from said segmented data.

2. The method of claim 1, wherein said analyzing of said data stream comprises carrying out statistical model-based change detection.

3. The method of claim 1, wherein said analyzing of said data stream comprises carrying out data mining model-based change detection.

4. The method of claim 1, wherein said dynamic updating of said hierarchical multi-stage model comprises applying a Bayesian inference technique.

5. The method of claim 4, further comprising using said hierarchical multi-stage model as an input to said Bayesian inference technique.

6. The method of claim 1, further comprising providing a system, wherein the system comprises distinct software modules, each of the distinct software modules being embodied on a computer-readable storage medium, and wherein the distinct software modules comprise a hierarchical modeling module, a change detection module, and a model updating module;
wherein:
said building is carried out by said hierarchical modeling module executing on at least one hardware processor;
said analyzing is carried out by said change detection module executing on said at least one hardware processor; and
said dynamic updating is carried out by said model updating module executing on said at least one hardware processor.

7. A non-transitory computer readable storage medium comprising computer executable instructions which when executed by a computer cause the computer to perform the method of:
building a hierarchical multi-stage model of asset failure risk for complex heterogeneously distributed physical assets, said hierarchical multi-stage model considering heterogeneity of failure patterns for said assets including seasonality and geographical distribution, by:
building a failure frequency analysis engine of said hierarchical multi-stage model;
building a failure association analysis engine of said hierarchical multi-stage model; and
building a failure prediction analysis engine of said hierarchical multi-stage model;
analyzing at least one data stream to determine a change in said failure patterns, including analyzing at least one of equipment failure history, maintenance records, equipment attributes, and sensor data; and
dynamically updating said hierarchical multi-stage model to obtain an updated hierarchical multi-stage model based at least in part on said change in said failure patterns;
wherein said considering heterogeneity of failure patterns for said assets comprises:
performing multi-dimensional segmentation on data comprising failure history for said assets to obtain segmented data; and
implementing hierarchical modeling to integrate heterogeneous clusters of failure risks for said assets from said segmented data.

8. The non-transitory computer readable storage medium of claim 7, wherein said analyzing of said data stream comprises carrying out statistical model-based change detection.

9. The non-transitory computer readable storage medium of claim 7, wherein said analyzing of said data stream comprises carrying out data mining model-based change detection.

10. The non-transitory computer readable storage medium of claim 7, wherein said dynamic updating of said hierarchical multi-stage model comprises applying a Bayesian inference technique.

11. The non-transitory computer readable storage medium of claim 10, further comprising computer executable instructions which when executed by said computer cause said computer to use said hierarchical multi-stage model as an input to said Bayesian inference technique.

12. The non-transitory computer readable storage medium of claim 7, wherein said computer-executable instructions comprise distinct software modules, each of the distinct software modules being embodied on said non-transitory computer readable storage medium, and wherein the distinct software modules comprise a hierarchical modeling module, a change detection module, and a model updating module;
wherein:
said building is carried out by said hierarchical modeling module;
said analyzing is carried out by said change detection module; and
said dynamic updating is carried out by said model updating module.

13. An apparatus comprising:
a memory;
at least one processor, coupled to said memory, and;
a non-transitory computer readable storage medium comprising computer executable instructions which when loaded into said memory configure said at least one processor to implement:
a hierarchical multi-stage model of asset failure risk for complex heterogeneously distributed physical assets, said hierarchical multi-stage model considering heterogeneity of failure patterns for said assets including seasonality and geographical distribution, said hierarchical multi-stage model in turn comprising:
a failure frequency analysis engine;
a failure association analysis engine; and
a failure prediction analysis engine;
a change detection component which analyzes at least one data stream to determine a change in said failure patterns, including analyzing at least one of equipment failure history, maintenance records, equipment attributes, and sensor data; and
a sequential model updating component which, based at least in part on said change in said failure patterns, dynamically updates said hierarchical multi-stage model to obtain an updated hierarchical multi-stage model;
wherein said hierarchical multi-stage model considers said heterogeneity of failure patterns for said assets by:
performing multi-dimensional segmentation on data comprising failure history for said assets to obtain segmented data; and
implementing hierarchical modeling to integrate heterogeneous clusters of failure risks for said assets from said segmented data.

14. The apparatus of claim 13, wherein said change detection component analyzes said at least one data stream by carrying out statistical model-based change detection.

15. The apparatus of claim 13, wherein said change detection component analyzes said at least one data stream by carrying out data mining model-based change detection.

16. The apparatus of claim 13, wherein said sequential model updating component dynamically updates said hierarchical multi-stage model by applying a Bayesian inference technique.

17. The apparatus of claim 16, wherein said non-transitory computer readable storage medium further comprises computer executable instructions which when loaded into said memory configure said at least one processor to use said hierarchical multi-stage model as an input to said Bayesian inference technique.

* * * * *